United States Patent [19]
Shirley et al.

[11] Patent Number: 5,178,039
[45] Date of Patent: Jan. 12, 1993

[54] MODULAR TRANSMISSION

[75] Inventors: Ralph E. Shirley, Waterloo, Iowa; Volker Hückler, Radolfzell; Uli Eckhardt, Speyer, both of Fed. Rep. of Germany

[73] Assignee: Deere & Company, Moline, Ill.

[21] Appl. No.: 823,916

[22] Filed: Jan. 22, 1992

[51] Int. Cl.⁵ ............................................. F16H 37/00
[52] U.S. Cl. .................... 74/606 R; 74/329; 74/331
[58] Field of Search ............... 74/329, 331, 359, 360, 74/606 R

[56] References Cited

U.S. PATENT DOCUMENTS

| | | | |
|---|---|---|---|
| 4,159,654 | 7/1979 | Hattori | 74/331 |
| 4,523,493 | 6/1985 | Weiss | 74/606 R X |
| 4,658,662 | 4/1987 | Rundle | 74/331 |
| 4,782,714 | 11/1988 | Schletzbaum et al. | 74/331 X |
| 4,901,590 | 2/1990 | Inui et al. | 74/331 |
| 4,983,153 | 1/1991 | Luijten | 74/606 R |
| 5,000,060 | 3/1991 | Reynolds et al. | 74/331 X |

FOREIGN PATENT DOCUMENTS

| | | |
|---|---|---|
| 0314644 | 5/1989 | European Pat. Off. |
| 0248899 | 10/1989 | European Pat. Off. |
| 0343146 | 11/1989 | European Pat. Off. |
| 2839749 | 3/1979 | Fed. Rep. of Germany |
| 2839796 | 3/1979 | Fed. Rep. of Germany |
| 2919856 | 3/1980 | Fed. Rep. of Germany |
| 3445531 | 1/1989 | Fed. Rep. of Germany |
| 61-31742 | 2/1986 | Japan ...................................... 74/331 |

OTHER PUBLICATIONS

Deutz literature: p. 44 "Synchronized Change-Speed Gearbox".

*Primary Examiner*—Leslie A. Braun
*Assistant Examiner*—William A. Trousdell

[57] ABSTRACT

A modular transmission is provided having a variety of flexible modules. These include very basic speed gearbox and range gearbox modules to which other modules can be added. The other modules can include a front wheel drive module, a supplemental reduction module, and an intermediate module. The intermediate module can include additional ranges and/or a creeper gear. The entire structure is highly flexible, and allows ready construction of a transmission to meet a particular customer's needs out of standard components which can be produced in mass quantities.

15 Claims, 4 Drawing Sheets

(12 GEAR W/O CREEPER)

(12 GEAR W/CREEPER)

(18 GEAR W/CREEPER)

MODULAR TRANSMISSION

BACKGROUND OF THE INVENTION

1. Field of the Invention

The present invention relates to transmissions, and in particular to modular transmissions for work vehicles.

2. Description of the Related Art

Work vehicles, such as agricultural and construction equipment, usually require transmissions providing a high number of gear ratios. The exact number of ratios, and the actual ratios required, vary from situation to situation.

The total sales volume for any given situation may not be large. This means that designing and manufacturing an appropriate transmission just for a single situation would be prohibitively expensive. Accordingly, it is desirable to design transmissions in a modular fashion, so that various components can be assembled in different fashions to meet the needs of a particular situation.

While the broad concept of modularity is known, the particular modules used and the degree to which a transmission is modular varies tremendously. Most modules merely constitute add-on features to a basic transmission, e.g., adding a hi-low planetary at the end of a standard transmission.

SUMMARY OF THE INVENTION

It is the object of the present invention to provide a highly modularized transmission in which each module should be able to be assembled with other modules to provide a wide variety of possible transmission structures.

The transmission according to the present invention is made up of a variety of modules which can be assembled in a variety of fashions. They include a basic range gearbox module and a basic speed gearbox module which, if assembled without any of the other modules, provide a 12 forward speed, 4 reverse speed transmission for use with a single drive axle.

A front wheel drive module can be mounted to the side of the range gearbox module to provide front wheel drive.

An intermediate module can be placed between the speed gearbox module and the range gearbox module to provide two additional ranges and/or to hold a creeper gearset. The two additional ranges can create an 18 forward speed, 6 reverse speed transmission. The creeper gear can provide for particularly slow speed operation of either the 12- or 18-speed transmission.

A supplemental gearbox module can be provided for inclusion in the range gearbox module to provide a further reduction of one of the ranges.

In addition to the various combinations of boxes, the transmission preferably is designed such that individual gears with the same radius but different numbers of gear teeth can be substituted for a number of the gears in the various boxes. This provides yet further flexibility in a highly compact structure.

DETAILED DESCRIPTION OF THE PREFERRED EMBODIMENTS

Figure 1:
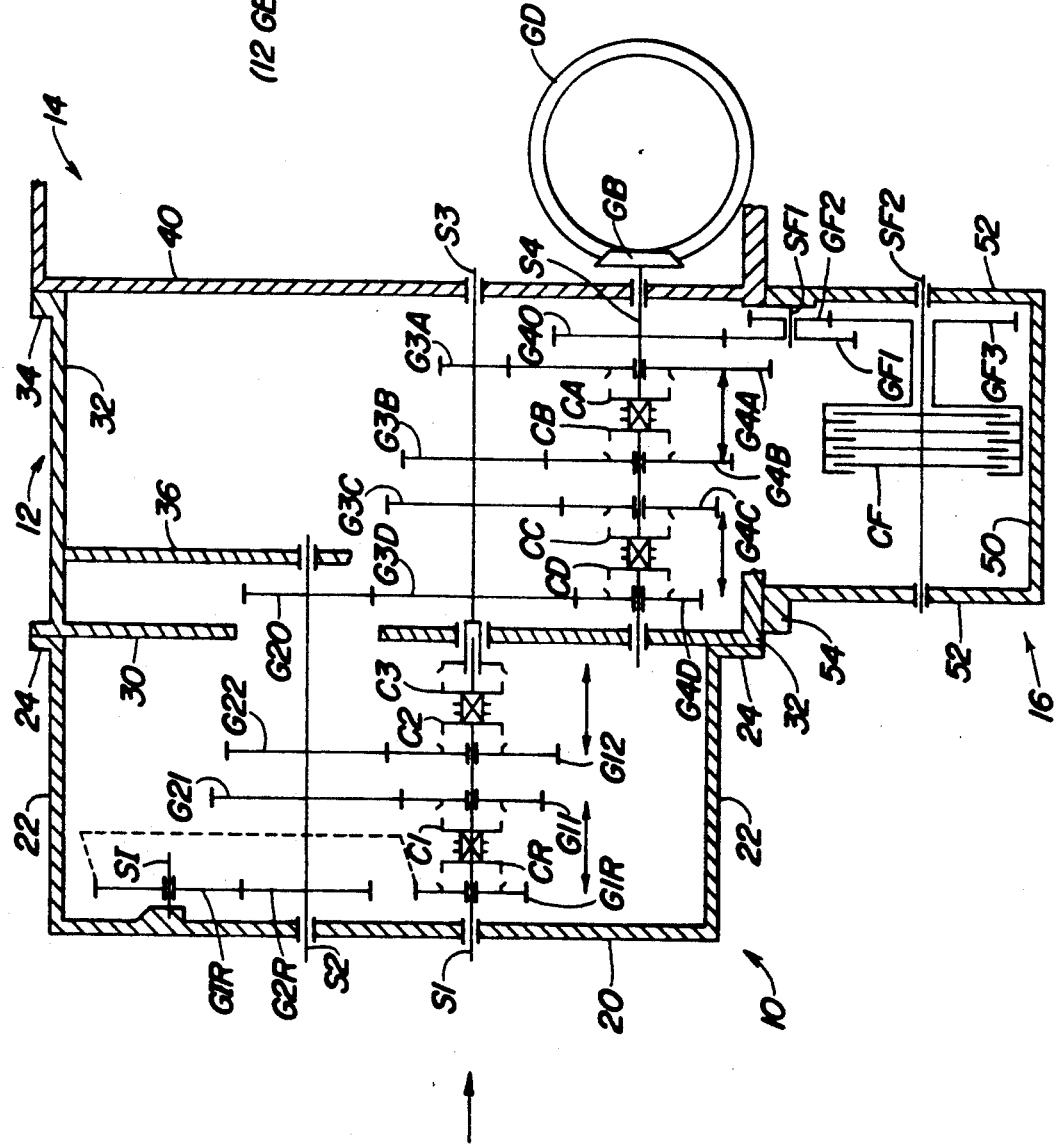
FIG. 1 illustrates modules according to the present invention assembled into a 12 forward speed, 4 reverse speed transmission with selectively engagable front wheel drive.

For clarity in the following discussion, the reference numerals of all shafts begin with the letter S, the reference numerals of all gears begin with the letter G, and the reference numerals of all clutches begin with the letter C. Except for a few gears on the differential, the front wheel drive gearbox module and the creeper module, the second letter of the reference numeral for all gears is the same as the shaft to which the gear is mounted, and the third letter indicates the speed or range with which the gear is used. For example, gear G2R is mounted to the second shaft and is used as one of the gears in the reverse gear train. Similarly, the second letter of the clutch reference numerals indicate the speed or range which the clutch engages or disengages. In addition, terms such as "right", "top" and the like used in the following discussion refer only to how the component is shown in the drawings, and should not be taken as placing any restriction on placement of the elements in an actual installation of the transmission.

FIG. 1 depicts a speed gearbox module 10, a range gearbox module 12, a differential case 14 and a front wheel drive gearbox module 16. The speed gearbox module 10 is generally hat-shaped, that is, it has a base 20 and sides 22, but is open on the side opposite from the base 20. A suitable flange 24 preferably is provided for mounting with an adjacent gearbox, e.g., range gearbox module 12, as shown.

Similarly, range gearbox module 12 is hat-shaped, with a base 30, sides 32 and flange 34. Range gearbox module 12 also preferably is provided with an internal wall 36 which serves as a shaft support structure, as discussed below.

Differential case 14 can be of any desired shape, provided the base 40 thereof will suitably close off the open side of the range gearbox module 12. If for some reason it is desired to space the range gearbox module 12 from the differential case 14, even this requirement can be omitted, and a simple plate substituted to close off the open side of range gearbox module 12.

The front wheel drive gearbox module 16 also is hat-shaped, with a base 50, sides 52 and flange 54. The open side of the front wheel drive gearbox module 16 is closed off by the side 32 of the range gearbox module 12.

Suitable openings are provided in the bases and sides of the gearbox modules 10, 12, 14 and 16 to mount the various shafts as discussed below, and to allow them to extend from one module into the next. If a particular shaft or opening is not needed in a particular configuration, appropriate plates (not shown) can be attached to the gearbox modules to close off such openings. For example, if front wheel drive is not desired, front wheel drive gearbox module 16 can be omitted, and a plate bolted across the opening in side wall 32 of range gearbox module 12.

Shaft S1 is mounted in speed gearbox module 10 in line with shaft S3, which is mounted inside range gearbox module 12. The right end of shaft S3 is rotatably mounted in the base plate 40 of the differential case 14.

The left end of shaft S3 is rotatably mounted in the base plate 30 of range gearbox module 12. The left end of shaft S1 is rotatably mounted in the base plate 20 of speed gearbox 10, while the right end of shaft S1 is rotatably mounted inside the left end of shaft S3.

Gears G1R, G11, G12 are rotatably mounted about shaft S1. Clutches CR, C1, C2, C3 also are mounted to shaft S1. Clutches CR, C1, C2 can selectively fix gears G1R, G11, G12, respectively, for rotation with shaft S1. Clutch C3 can selectively fix shaft S3 for rotation with shaft S1.

The left end of shaft S2 is rotatably mounted in the base plate 20 of speed gearbox module 10, while the right end is rotatably mounted in internal wall 36 in the range gearbox module 12. Gears G2R, G21, G22, G20 are mounted to and fixed for rotation with shaft S2. Gears G21, G22 mesh continuously with gears G11, G12, respectively.

Idler shaft SI is supported by base plate 20 in speed gearbox module 10. Idler gear GIR is rotatably mounted about shaft SI, and meshes continuously with both gears G2R and G1R.

Gears G3D, G3C, G3B, G3A are mounted to and fixed for rotation with shaft S3. Gear G3D meshes continuously with gear G20.

The left end of shaft S4 is rotatably supported by the base plate 30 of range gearbox module 12, while the right end extends through and is rotatably supported by the base plate 40 of differential case 14. Gears G4D, G4C, G4B, G4A are rotatably mounted about shaft S4 inside range gearbox module 12. Gear G40 is mounted to and fixed for rotation with shaft S4 inside range gearbox module 12, while bevel gear GB is mounted to and fixed for rotation with shaft S4 inside differential case 14. Differential gear GD also is rotatably mounted inside differential case 14, and meshes continuously with bevel gear GB. Clutches CD, CC, CB, CA are mounted to shaft S4 and can selectively connect gears G4D, G4C, G4B, G4A, respectively, for rotation with shaft S4.

Shaft SF1 is supported by side 52 of front wheel drive gearbox module 16. A double gear having sets of teeth GF1, GF2 is rotatably mounted about shaft SF1. Gear tooth set GF1 meshes continuously with gear G40. Shaft SF2 also is rotatably supported at each end thereof in walls 52 of the front wheel drive gearbox module 16, and has at least one end (not shown) extending beyond the module 16 to connect to a front wheel drive mechanism. Gear GF3 is rotatably mounted about shaft SF2 and meshes continuously with gear tooth set GF2. Clutch CF is mounted to shaft SF2 and can selectively fix gear GF3 for rotation with shaft SF2.

As will be apparent to one of ordinary skill in the art from the foregoing, upon application of input power at the left end of shaft S1, an operator can activate any of clutches CR, C1, C2, C3 to select among speeds REVERSE, FIRST, SECOND and THIRD, with output from speed gearbox module 10 being provided to shaft S3 either directly (through clutch C3) or indirectly through the meshing of gears G20 and G3D. The operator then can selectively activate any of clutches CD, CC, CB, CA to chose among the various ranges D, C, B, A, respectively, with output from the range gearbox module 12 being provided to the differential gear GD by way of the bevel gear GB. If a front wheel drive module 16 is installed, as shown, output also can be provided by gear G40 to the front wheel drive module 16. If clutch CF is activated, power will be provided to the front wheels. If no front wheel drive gearbox module 16 is provided, gear G40 may be omitted, if desired.

Figure 2:
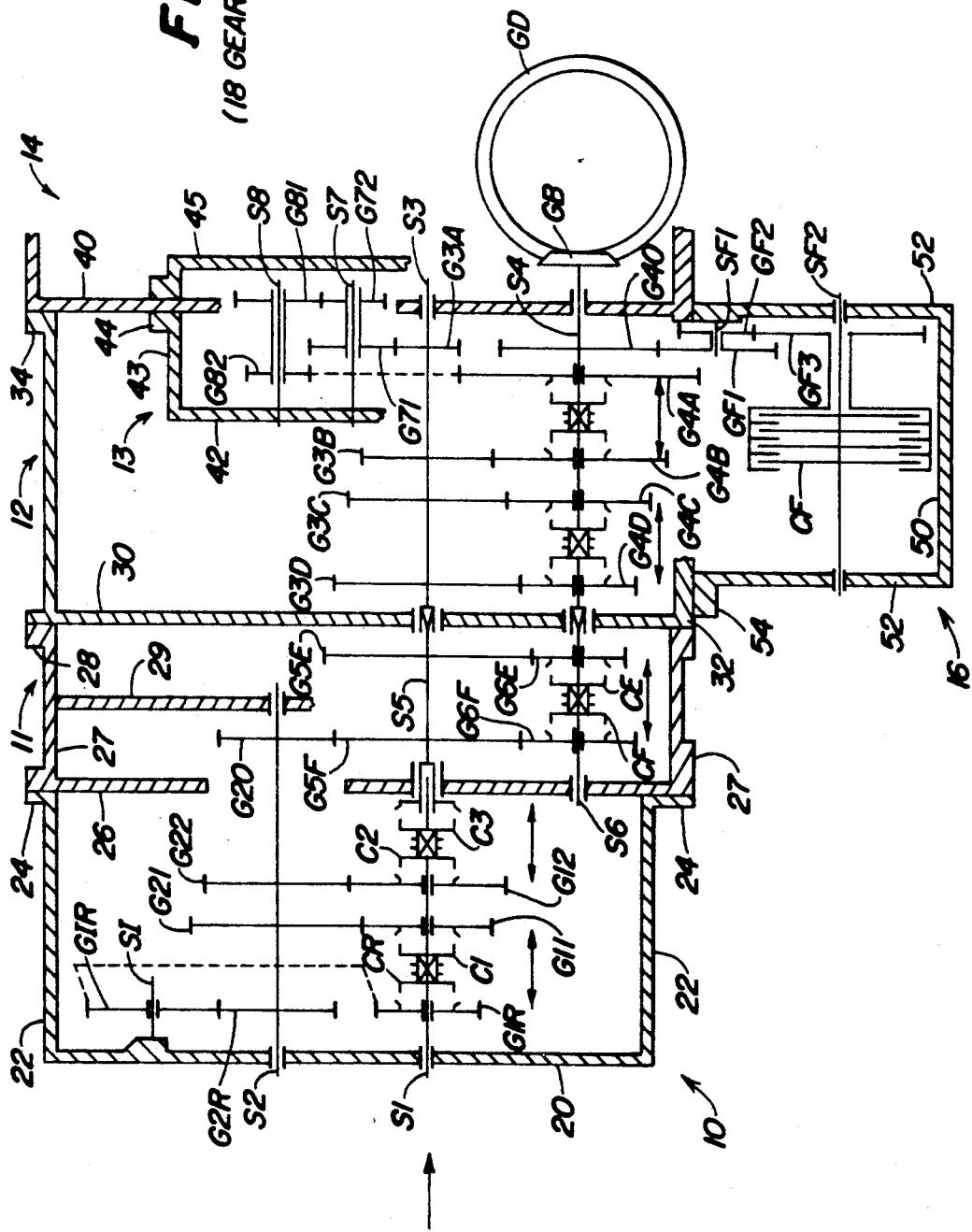
FIG. 2 illustrates modules according to the present invention assembled into an 18 forward speed, 6 reverse speed transmission with selectively engagable front wheel drive and a supplemental reduction of one range.

Turning to FIG. 2, two additional modules have been added to those previously shown in FIG. 1. Intermediate gearbox module 11 is positioned between speed gearbox module 10 and range gearbox module 12. Intermediate gearbox module 11 is generally hat-shaped, with a base 26, sides 27, and flange 28. As shown, the base 26 of intermediate module 11 substantially closes off the open side of speed gearbox module 10, while the base 30 of range gearbox module 12 substantially closes off the open side of intermediate gearbox module 11. Intermediate gearbox module 11 also is provided with an intermediate wall 29 in substantially the same position as the intermediate wall shown in the prior embodiment inside range gearbox module 12. The internal wall 36 in range gearbox 12 can be omitted, if desired, in this embodiment.

In this embodiment, shafts S3 and S4 are still supported in the bases 30 and 40, as before. However, where the left end of shaft S3 previously supported shaft S1, it now supports the right end of shaft S5, which is positioned in the intermediate gearbox module 11. In addition, where shaft S1 was rotatably journalled in shaft S3, shaft S5 is splined or otherwise fixed for rotation with shaft S3. The left end of shaft S5 is rotatably mounted in base plate 26 of intermediate gearbox module 11, and has the right end of shaft S1 journalled therein in much the fashion that shaft S1 previously was journalled in shaft S3. Clutch C3 also now selectively fixes shaft S5 (and indirectly shaft S3) for rotation with shaft S1, rather than fixing shaft S3 directly. Gears G5F, G5E are mounted to a fixed for rotation with shaft S5. Instead of meshing continuously with gear G3D, gear G20 now meshes continuously with gear G5F.

Shaft S6 is rotatably mounted between the bases 26, 30, and is splined or otherwise fixed for rotation with shaft S4. Gears G6F, G6E are rotatably mounted about shaft S6, and mesh continuously with gears G5F, G5E, respectively. Clutches CF, CE are mounted to shaft S6 for selectively fixing gears G6F, G6E, respectively, for rotation with shaft S6.

As will be apparent to one of ordinary skill in the art, the addition of the two clutched gears, G6F, G6E, adds two more ranges to the prior four ranges A through D. This converts the prior 12 forward speed, 4 reverse speed transmission into an 18 forward speed, 6 reverse speed transmission.

Also shown in FIG. 2 is a supplemental gearbox module 13, which also can be hat-shaped. The supplemental gearbox module includes a base 42, at least one side 43 and a flange 44 for mounting to the base plate 40. A corresponding cover plate 45 is shown mounted to the other side of base plate 40.

Shafts S7, S8 are supported between base plates 42, 45. A double gear is rotatably mounted about shaft S7 and has two teeth sets G71, G72, with gear tooth set G71 meshing continuously with gear G3A. Another double gear is rotatably mounted about shaft S8, and has gear teeth sets G81, G82, with gear tooth set G81 meshing continuously with gear tooth set G72, and gear tooth set G82 meshing continuously with gear G4A.

As will be apparent, the gearset in supplemental gearbox module 13 adds a further reduction to range A of the four ranges in the range gearbox module 12. While it is shown in the drawing with the 18-speed transmission, it could also be added to the 12-speed transmission, if desired.

The gearset in supplemental gearbox module 13 is particularly easy to modify for use in a particular situation, since large variations in reduction can be provided simply by changing the particular double gears used on the two shafts S7, S8. In addition, the cover plate 45 can be omitted if a suitable support structure is otherwise provided in the differential case 14.

Figure 3:
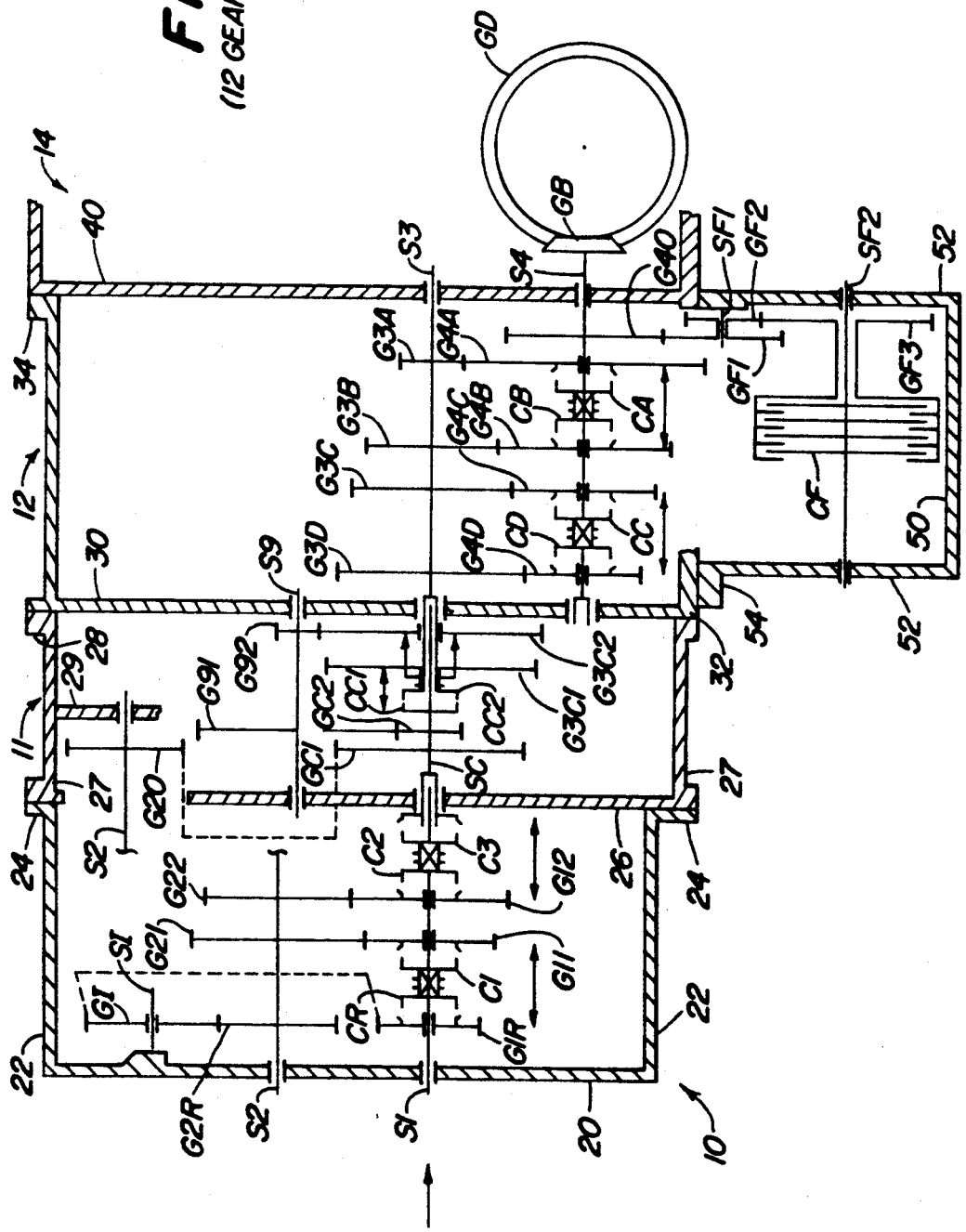
FIG. 3 illustrates the 12-speed transmission of FIG. 1 with a creeper module added.

Turning to FIG. 3, intermediate gearbox module 11 again has been substituted between speed gearbox module 10 and range gearbox module 12. This time, however, instead of enclosing additional range gears, it encloses a creeper gear. For clarity of illustration, the cross-section through the transmission has been changed slightly so that the shaft S2 appears split, with the right end thereof in intermediate range box 11 shown positioned near the upper wall 27. The actual structure is substantially identical to that shown in FIG. 2, and it is only the drawing view that is different, not the actual physical structure.

In this embodiment, a creeper shaft SC is positioned in substantially the same location as shaft S5 in the embodiment shown in FIG. 2, that is, with its right end supported by shaft S3 and its left end supporting shaft S1. As with shaft S5, the left end of shaft SC is clutchable by clutch C3 for rotation with shaft S1. Unlike shaft S5, the right end is journalled within shaft S3, rather than being splined to it. Gears GC1, GC2 are fixed for rotation with shaft SC, with gear GC1 meshing continuously with gear G20. Gear G3C1 is mounted to and fixed for rotation with a portion of shaft S3 extending into intermediate gearbox module 11, while gear G3C2 is rotatably mounted about the same portion of shaft S3.

Shaft S9 has its ends journalled in base plates 26, 30. Gears G91, G92 are fixed for rotation with shaft S9, and mesh continuously with gears GC2, G3C2, respectively.

Creeper clutches CC1, CC2 are mounted about shaft SC. Clutch CC1 can selectively fix shaft S3 for rotation with shaft SC, effectively bypassing the creeper. Clutch CC2, which preferably is a pin-type clutch, can selectively fix shaft S3 for rotation with gear G3C2 to engage the creeper.

Figure 4:
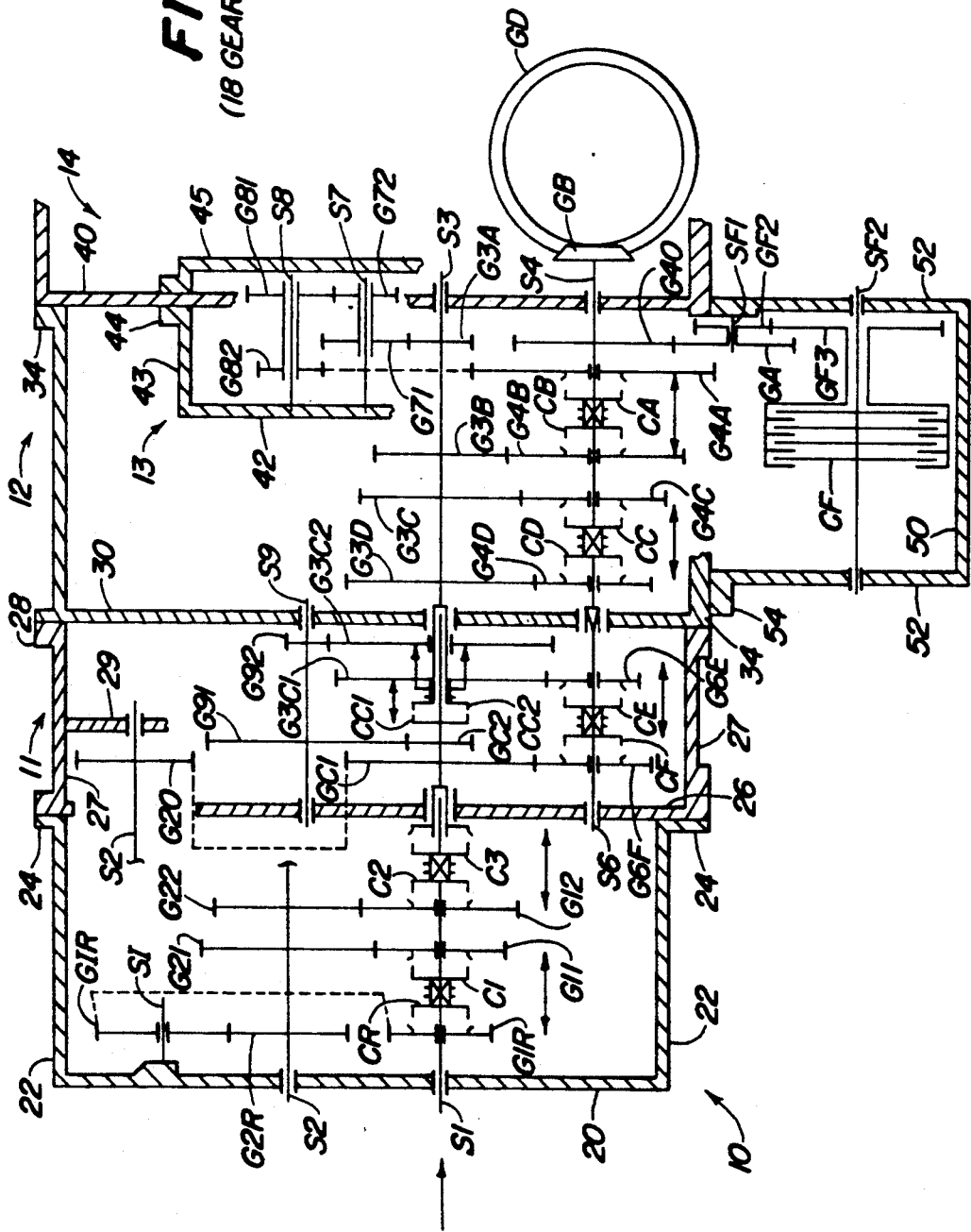
FIG. 4 illustrates the 18-speed transmission of FIG. 2 with a creeper module added.

FIG. 4 shows a transmission with all of the previously described modules included. This structure is essentially similar to that just described with respect to FIG. 3, with the addition of shaft S6 and its related components. In this embodiment, gears G6F, G6E mesh continuously with gears GC1, G3C1, rather than gears G5F, G5E.

As will be apparent, the present collection of modules provides an extremely high degree of flexibility simply by picking and choosing which of the various modules can be put together. In addition, the design is such that even within a given module, the precise gear ratios can be changed readily by substituting gears with the same diameter, but a differing number of teeth, using profile offset. The result is a highly flexible transmission design, made entirely of components which can be made in quantity, at a reasonable cost.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:
1. A transmission which can be selectively assembled from a variety of gearbox modules, each module having a housing enclosing associated gearing components such as gears, shafts, shifters and the like, characterized in that:
   a. at least a first and a second one of said gearbox modules have generally hat-shaped housings, each having a base plate, sides surrounding said base plate and an opening opposite said base plate, said base plate of said second gearbox module mounting to said first gearbox module to substantially close the opening of said first gearbox module;
   b. said first gearbox module comprising a multi-speed gearbox having:
      i. a first input shaft having a first end rotatably supported by said base plate of said first gearbox module and a second end rotatably supported by said base plate of said second gearbox module;
      ii. two free gears rotatably mounted about said input shaft;
      iii. shifters for selectively fixing said free gears for rotation with said input shaft;
      iv. a first countershaft having a first end rotatably mounted to said base plate of said first gearbox module;
      v. two fixed gears mounted to said countershaft and fixed for rotation therewith, each said fixed gear meshing continuously with a corresponding one of said free gears; and
      vi. a first output gear mounted to said countershaft adjacent said second end thereof and fixed for rotation therewith; and
   c. said second gearbox module comprising:
      i. an opening formed in said base plate of said second gearbox module through which said first countershaft extends;
      ii. a support structure for rotatably supporting a second end of said first countershaft;
      iii. a second input shaft rotatably mounted in said second gearbox module; and
      iv. a second input gear mounted to said second input shaft and meshing continuously with said first output gear.

2. The transmission of claim 1, further characterized in that a second end of said first input shaft is rotatably supported by said second input shaft, which in turn is rotatably supported in said base plate of said second gearbox module, and further comprising a shifter for selectively fixing said first input shaft for rotation with said second input shaft.

3. The transmission of claim 1, further characterized in that said first gearbox module further comprises:
   a. a reverse free gear rotatably mounted about said first input shaft;
   b. a shifter for selectively fixing said reverse free gear for rotation with said first input shaft;
   c. a third fixed gear mounted to said first countershaft and fixed for rotation therewith;
   d. a reverse idler shaft mounted to said base plate of said first gearbox module;
   e. a reverse idler gear rotatably mounted to said reverse idler shaft and meshing continuously with said reverse free gear and said reverse idler gear.

4. The transmission of claim 1, further characterized in that one of said gearbox modules, which may be said second gearbox module, is a range gearbox module and comprises:

a. a generally hat-shaped housing, having a base plate, sides surrounding said base plate and an opening opposite said base plate;

b. a range gearbox input shaft having a first end rotatably mounted in said base plate of said range gearbox module;

c. a plurality of fixed gears mounted to said range gearbox input shaft for rotation therewith;

d. a range gearbox countershaft having a first end rotatably mounted in said base plate of said range gearbox module;

e. a plurality of free gears rotatably mounted about said range gearbox countershaft, each said free gear meshing with a corresponding one of said fixed gears; and f. a plurality of shifters for selectively fixing each of said free gears for rotation with said range gearbox countershaft;

and in that an additional gearbox module closes off the opening of said range gearbox module, with a second end of said range gearbox input shaft and a second end of said range gearbox countershaft rotatably supported by a base plate of said additional gearbox module.

5. The transmission of claim 4, further characterized in that said additional module comprises a differential module having a bevel gear-type differential therein, and in that said range gearbox countershaft extends into said differential module and has the bevel gear of said bevel-type differential mounted thereto and fixed for rotation t 6. The transmission of claim 4, further characterized in that the size and tooth count of the gears making up said pluralities of fixed and free gears can be changed without the need to change the size or position of said range gearbox shafts and shifters.

7. The transmission of claim 4, further characterized in that said range gearbox module is said second gearbox module, and said range gearbox input shaft is said second input shaft.

8. The transmission of claim 4, further characterized in that an intermediate gearbox module is positioned between said multi-speed gearbox module and said range gearbox module, and comprises:

a. a generally hat-shaped housing, having a base plate, sides surrounding said base plate and an opening opposite said base plate, said base plate of said intermediate gearbox module closing off the opening of said multi-speed gearbox module and said base plate of said range gearbox module closing off the opening of said intermediate gearbox module;

b. a first intermediate shaft having a first end rotatably supported by said base plate of said intermediate gearbox module, and a second end fixed for rotation with said range gearbox input shaft, which in turn is rotatably supported by said base plate of said range gearbox module;

c. two fixed gears fixed for rotation with said first intermediate shaft;

d. a second intermediate shaft having a first end rotatably supported by said base plate of said intermediate gearbox module and a second end fixed for rotation with said range gearbox countershaft, which in turn is rotatably supported by said base plate of said range gearbox module;

e. two free gears rotatably mounted about said second intermediate shaft, said free gears on said second intermediate shaft meshing continuously with said fixed gears on said first intermediate shaft;

f. shifters for selectively fixing said free gears for rotation with said second intermediate shaft.

9. The transmission of claim 8, further characterized in that said free gears in said intermediate gearbox module have the same diameter as but a different tooth count from said free gears in said range gearbox module.

10. The transmission of claim 4, further characterized in that an intermediate gearbox module is positioned between said multi-speed gearbox module and said range gearbox module, and comprises:

a. a generally hat-shaped housing, having a base plate, sides surrounding said base plate and an opening opposite said base plate, said base plate of said intermediate gearbox module closing off the opening of said multi-speed gearbox module and said base plate of said range gearbox module closing off the opening of said intermediate gearbox module;

b. a first creeper shaft having a first end rotatably supported by said base plate of said intermediate gearbox module and a second end rotatably supported by said base plate of said range gearbox module;

c. two fixed gears fixed for rotation with said first creeper shaft;

d. a second creeper shaft having a first end rotatably supported by said base plate of said intermediate gearbox module and a second end rotatably supported by said second input shaft, which in turn is rotatably supported by said base plate of said range gearbox module;

e. a first creeper fixed gear fixed for rotation with said second creeper shaft and meshing continuously with said first output gear, a second creeper fixed gear fixed for rotation with said second creeper shaft and meshing continuously with one of said fixed gears on said first creeper shaft, and a creeper free gear rotatably mounted about said second input shaft and meshing continuously with the other of said fixed gears on said first creeper shaft;

f. a creeper shifter for selectively fixing second input shaft for rotation with one of said second creeper shaft and said creeper free gear.

11. The transmission of claim 10, further characterized in that said intermediate gearbox module further comprises:

a. an intermediate countershaft having a first end rotatably supported by said base plate of said intermediate gearbox module and a second end fixed for rotation with said range gearbox countershaft, which in turn is rotatably supported by said base plate of said range gearbox module;

b. a third creeper fixed gear fixed for rotation with said second creeper shaft;

c. two free gears rotatably mounted about intermediate countershaft and each meshing continuously with one of said first and third creeper fixed gears;

d. shifters for selectively fixing said free gears for rotation with said intermediate countershaft.

12. The transmission of claim 4, further characterized in that one side of said range gearbox module has an opening formed therein and an output gear fixed for rotation with said range gearbox countershaft, and in which the transmission includes a front wheel drive gearbox module, which comprises:

a. a generally hat-shaped housing mounted to said range gearbox module and having a base plate, sides surrounding said base plate and an opening opposite said base plate, the sides of said range gearbox module around said opening in said range gearbox module closing off the opening of said front wheel drive gearbox module;

b. an input double gear rotatably mounted in said front wheel drive gearbox and having a first and a second set of teeth, the first set of teeth meshing continuously with said range gearbox output gear;

c. an output shaft rotatably mounted in and extending out of said front wheel drive gearbox module;

d. an output gear rotatably mounted about said output shaft and meshing continuously with the second set of teeth on said input double gear; and e. a clutch for selectively fixing said output gear for rotation with said output shaft.

13. The transmission of claim 12, further characterized in that park brake means are provided in said range gearbox module for selectively fixing said range gearbox output gear against rotation relative to the housing of said range gearbox module.

14. The transmission of claim 4, further characterized in that a supplemental gearbox module is provided substantially inside said range gearbox module, said supplemental gearbox module comprising:

a. a support structure mounted substantially inside the housing of said range gearbox module;

b. reduction gearset means for transmitting power from one of said fixed gears on said range gearbox input shaft to on of said free gears on said range gearbox countershaft at a reduce rotational rate.

15. The transmission of claim 14, further characterized in that said reduction gearset means comprises:

a. a first double gear rotatably mounted to said support structure of said supplemental gearbox module, and having its first set of teeth meshing continuously with said fixed gear on said range gearbox input shaft;

b. a second double gear rotatably mounted to said support structure of said supplemental gearbox module, and having its first set of teeth meshing continuously with the second set of teeth of said first double gear, and its second set of teeth meshing continuously with said free gear on said range gearbox countershaft.

* * * * *

UNITED STATES PATENT AND TRADEMARK OFFICE
CERTIFICATE OF CORRECTION

PATENT NO. : 5,178,039
DATED : 12 Jan 1993
INVENTOR(S) : Ralph Edwin Shirley et al.

It is certified that error appears in the above-indentified patent and that said Letters Patent is hereby corrected as shown below:

In Col. 7, line 30, after "rotation", delete "t" and insert -- therewith. --.

Signed and Sealed this

Eleventh Day of January, 1994

Attest:

BRUCE LEHMAN

Attesting Officer     *Commissioner of Patents and Trademarks*